US009817651B2

(12) United States Patent
Viswanathan et al.

(10) Patent No.: US 9,817,651 B2
(45) Date of Patent: Nov. 14, 2017

(54) RECOMMENDING UPDATES TO AN INSTANCE IN A SAAS MODEL

(71) Applicants: Rajaram Viswanathan, Bangalore (IN); I.V.S. Narayana, Bangalore (IN); Nischal Rao, Bangalore (IN); William Doolittle, San Francisco, CA (US); Natasha Loeffler-Little, Half Moon Bay, CA (US); Anusha Venkatesan, Bangalore (IN)

(72) Inventors: Rajaram Viswanathan, Bangalore (IN); I.V.S. Narayana, Bangalore (IN); Nischal Rao, Bangalore (IN); William Doolittle, San Francisco, CA (US); Natasha Loeffler-Little, Half Moon Bay, CA (US); Anusha Venkatesan, Bangalore (IN)

(73) Assignee: SUCCESSFACTORS, INC., South San Francisco, CA (US)

( * ) Notice: Subject to any disclaimer, the term of this patent is extended or adjusted under 35 U.S.C. 154(b) by 50 days.

(21) Appl. No.: 14/216,542

(22) Filed: Mar. 17, 2014

(65) Prior Publication Data
US 2015/0261518 A1   Sep. 17, 2015

(51) Int. Cl.
*G06F 9/44*   (2006.01)
*G06F 9/445*   (2006.01)

(52) U.S. Cl.
CPC . *G06F 8/65* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 2006/0248372 | A1* | 11/2006 | Aggarwal | G06F 9/5044 714/4.5 |
| 2007/0169113 | A1* | 7/2007 | Moore | G06F 8/61 717/174 |
| 2011/0047540 | A1* | 2/2011 | Williams et al. | 717/178 |
| 2011/0125894 | A1* | 5/2011 | Anderson | H04L 9/3213 709/224 |
| 2011/0271270 | A1* | 11/2011 | Bowen | G06F 8/67 717/171 |
| 2011/0271278 | A1* | 11/2011 | Dittrich | 718/1 |
| 2012/0102487 | A1* | 4/2012 | Cahill | H04L 67/1097 718/1 |
| 2012/0124211 | A1* | 5/2012 | Kampas | G06F 9/50 709/226 |

(Continued)

*Primary Examiner* — Insun Kang
(74) *Attorney, Agent, or Firm* — Fountainhead Law Group P.C.

(57) ABSTRACT

Techniques are described for recommending updates to a customer instance in a software as a service (SaaS) model. A request can be received to upgrade features belonging to the customer instance. In response to receiving the request, a feature configuration that corresponds to the customer instance can be identified. The feature configuration can a plurality of features from the SaaS model that are available to the customer interface. Once the feature configuration has been identified, a feature upgrade from a plurality of feature upgrades in an upgrade library can be determined to be applicable to the customer instance. The determination can be made by evaluating the upgrade library and the feature configuration.

20 Claims, 8 Drawing Sheets

(56) References Cited

U.S. PATENT DOCUMENTS

| | | | |
|---|---|---|---|
| 2013/0042229 A1* | 2/2013 | Jang ........................... | 717/171 |
| 2013/0159993 A1* | 6/2013 | Misovski et al. ............. | 717/177 |
| 2013/0297802 A1* | 11/2013 | Laribi ..................... | H04L 47/80 |
| | | | 709/226 |
| 2013/0332718 A1* | 12/2013 | Dicker .................... | H04L 67/34 |
| | | | 713/2 |
| 2013/0346945 A1* | 12/2013 | Yousouf ................... | G06F 8/36 |
| | | | 717/121 |
| 2014/0059534 A1* | 2/2014 | Daum et al. ................. | 717/172 |
| 2014/0068588 A1* | 3/2014 | Tan .......................... | G06F 8/67 |
| | | | 717/169 |
| 2014/0075427 A1* | 3/2014 | Pallamreddy et al. ....... | 717/172 |
| 2014/0129690 A1* | 5/2014 | Jaisinghani ........... | H04L 47/827 |
| | | | 709/222 |
| 2014/0137097 A1* | 5/2014 | Sakai ....................... | G06F 8/65 |
| | | | 717/172 |
| 2014/0143752 A1* | 5/2014 | Rumer ..................... | G06F 8/30 |
| | | | 717/106 |
| 2014/0143769 A1* | 5/2014 | Nigul ......................... | 717/171 |
| 2014/0149591 A1* | 5/2014 | Bhattacharya ...... | H04L 67/1097 |
| | | | 709/226 |
| 2014/0173105 A1* | 6/2014 | Sarfati et al. ................ | 709/224 |
| 2015/0067665 A1* | 3/2015 | Thomas et al. .............. | 717/168 |
| 2015/0180714 A1* | 6/2015 | Chunn ............... | H04L 67/1097 |
| | | | 709/221 |
| 2015/0264122 A1* | 9/2015 | Shau ...................... | H04L 67/10 |
| | | | 709/203 |

* cited by examiner

RECOMMENDING UPDATES TO AN INSTANCE IN A SAAS MODEL

BACKGROUND

Software as a Service (SaaS) is a software application delivery model where an application service provider (ASP) hosts software applications and associated data on the cloud. Multiple instances of a software application can be stored on the cloud where each application instance has functionality that is tailored for a particular tenant (i.e., customer instance) or a particular group of users that belong to the tenant. This results in some application instances having different functionality than others. A provisioning service can enable and disable functionality for the various instances. Each instance can have a unique configuration.

The ASP can periodically update the hosted software applications to add new features, fix bugs, or update existing features. As a result, a tenant's application instance may need to be reconfigured to include the updates. The update process can be time consuming and confusing. First of all, it may be difficult for a tenant to determine which upgrades are applicable based on their current configuration or type of licenses they have purchased. As a result, the tenant may select an update for a feature that is not available to the tenant. Secondly, a tenant needs to read release notes, attend webinars, read press releases, watch training videos, or contact customer support to learn about the upgrade. Once the tenant has been properly educated, the tenant needs to contact customer support or technical support. The support team needs to verifies that the tenant understands the changes in the upgrade and can perform the upgrade. Once these conditions are met, the support team provisions the tenant's application instance to include the upgrade. This process is time consuming and requires many rounds of communication between the tenant and the ASP, which can be an undesirable to the tenant. Tenants can find the process daunting and as a result choose to skip updates.

SUMMARY

In one embodiment, a computer-implemented method performs, by a mobile computing device, receiving a request to upgrade features belonging to a customer instance in a software as a service (SaaS) model. The method then continues with identifying a feature configuration that corresponds to the customer instance, the feature configuration defining a plurality of features from the SaaS model that are available to the customer instance. The method then determines that a feature upgrade from a plurality of feature upgrades in an upgrade library is applicable to the customer instance based on the feature configuration and the plurality of feature upgrades.

In another embodiment, a non-transitory computer readable storage medium stores one or more programs comprising instructions for receiving a request to upgrade features belonging to a customer instance in a software as a service (SaaS) model, identifying a feature configuration that corresponds to the customer instance, the feature configuration defining a plurality of features from the SaaS model that are available to the customer instance, and determining that a feature upgrade from a plurality of feature upgrades in an upgrade library is applicable to the customer instance based on the feature configuration and the plurality of feature upgrades.

In another embodiment, a computer implemented system comprises one or more computer processors and a non-transitory computer-readable storage medium. The non-transitory computer-readable storage medium comprises instructions, that when executed, receive a request to upgrade features belonging to a customer instance in a software as a service (SaaS) model, identify a feature configuration that corresponds to the customer instance, the feature configuration defining a plurality of features from the SaaS model that are available to the customer instance, and determine that a feature upgrade from a plurality of feature upgrades in an upgrade library is applicable to the customer instance based on the feature configuration and the plurality of feature upgrades.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
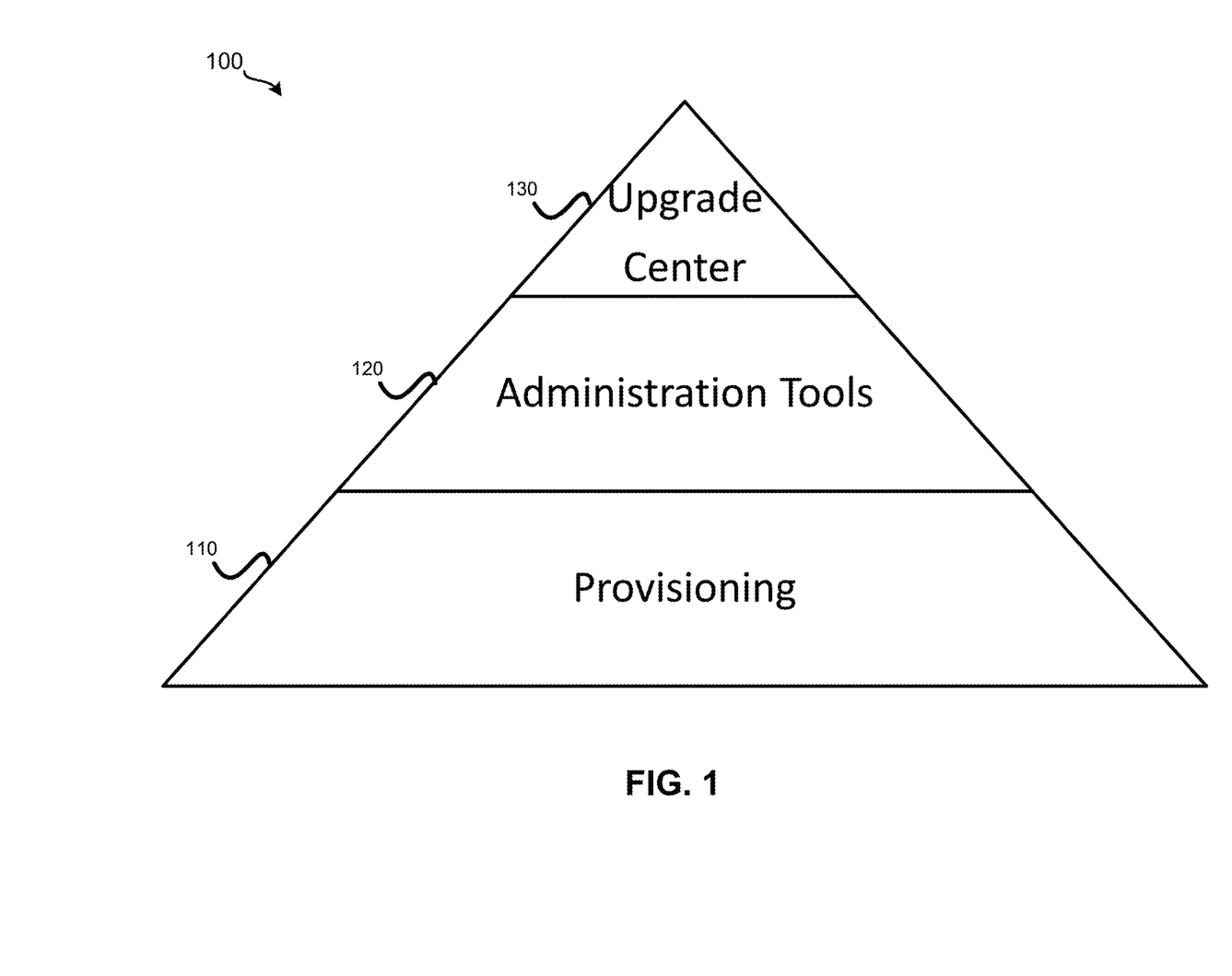
FIG. 1 illustrates system for managing a web based software service being supplied by an application service provider (ASP) according to one embodiment.

FIG. 1 illustrates system 100 for managing a web based software service being supplied by an application service provider (ASP) according to one embodiment. The ASP may provide the software service using a software as a service (SaaS) delivery model. SaaS is a delivery model where the software application is centrally hosted on the cloud and is accessed by a customer instance through a web browser.

As shown, system 100 includes provisioning layer 110. Provisioning layer 110 is configured to provision different modules and features of the software service for a given customer instance. Provisioned modules and features can be accessed by the customer instance to perform specific tasks. In contrast, un-provisioned modules and features can remain inaccessible to the customer instance. In one embodiment, provisioning layer 110 can provision a feature or module that is available for a given customer instance. For example, features A, B, and C can be provisioned for a first customer instance while features A and C are provisioned for a second customer instance.

Administration tools layer 120 sits above provisioning layer 110. Administration tools layer 120 includes tools for configuring the software service. In one embodiment, administration tools layer 120 can instruct provisioning layer 110 to provision a feature for a customer instance. Administration tools layer 120 can limit the provisioning to features which have been licensed or otherwise purchased by the customer instance. Different features may become available to the customer instance depending on the license or package purchased. In some examples, access to administration tools layer 120 may require certain permissions. For instance, an employee with an administrator permission may access the tools in administration tools layer 120 to provision a feature while an employee with a developer permission may access the tools in administration tools layer 120 to view the feature but not to provision the feature.

Upgrade center layer 130 sits above administration tools layer 120. Upgrade center layer 130 is configured to recommend upgrades to a customer instance. The upgrades can be feature upgrades or software updates that may enhance the experience or functionality of the software service for the customer instance. In one embodiment, upgrade center 130 can receive an upgrade request and automatically analyze a variety of factors to identify one or more eligible upgrades for the customer instance. An eligible upgrade is an upgrade which can be enabled by the customer instance. In contrast, an available upgrade is an update which is available to the customer instance but cannot be currently enabled for one or more reasons. Exemplary reasons can include missing dependencies, missing prerequisites, or missing user permissions, to name a few. Upgrade center layer 130 can analyze provisioned features of the customer instance, available features of the customer instance, and the available upgrades to identify an upgrade that can be enabled by the customer instance. In some examples, the upgrade can be presented to the customer instance where a decision can be made as to whether the customer instance should enable the upgrade. A decision to enable the upgrade is passed to administration tools layer 120 for processing, which in turn instructs provisioning layer 110 to provision the corresponding feature/upgrade on the customer instance.

Figure 2:
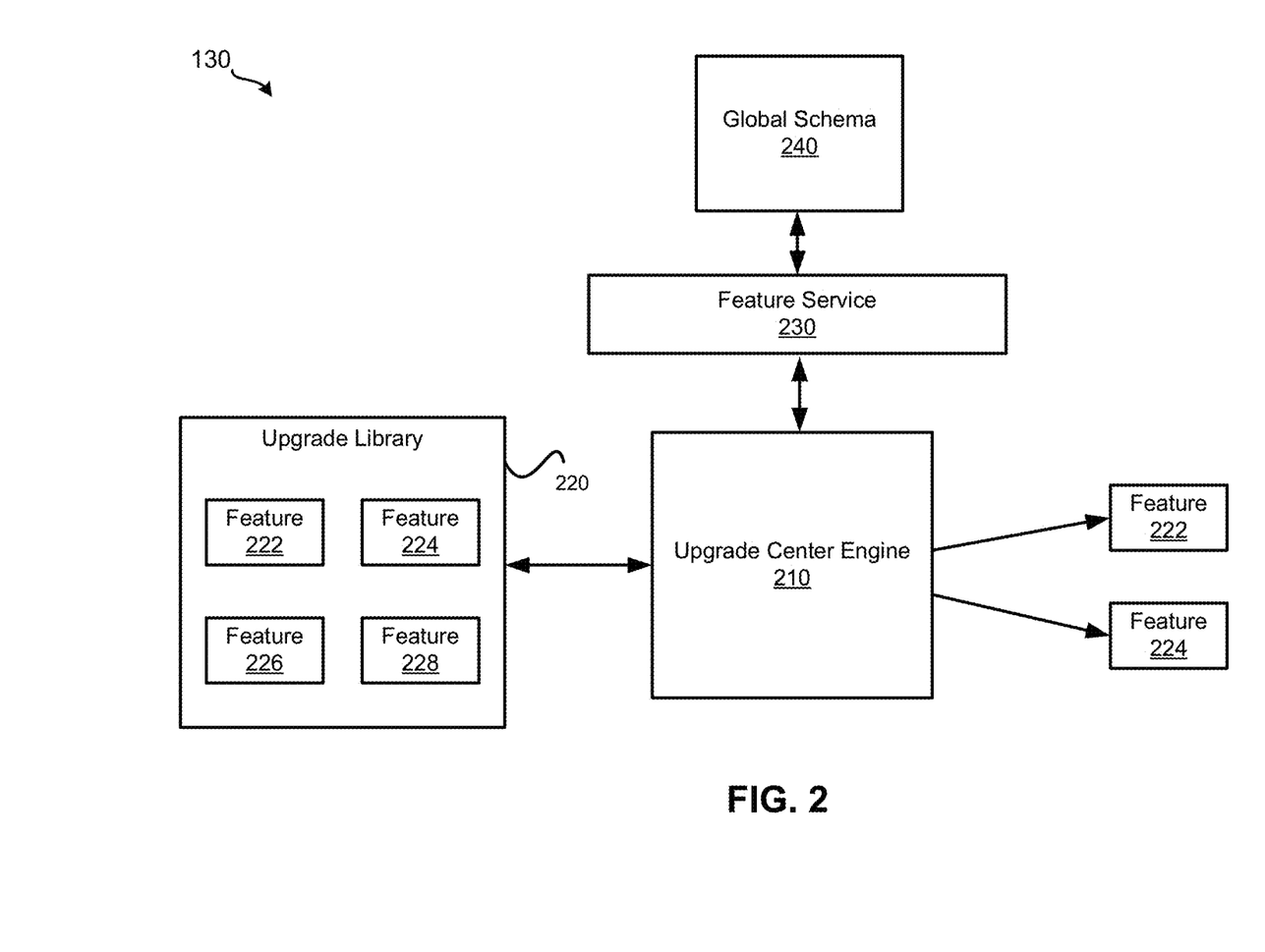
FIG. 2 illustrates an upgrade center layer according to one embodiment.

FIG. 2 illustrates upgrade center layer 130 according to one embodiment. Upgrade center layer 130 includes upgrade library 220 which stores information on features that can be enabled by the customer instance through upgrade center layer 130. Upgrade library 220 can store information on some of the features of the software service that have been identified as features which will be offered through the upgrade center. In contrast, other features of the software service can be offered to the customer instance as features that can be upgraded by contacting customer support. Here, upgrade library 220 stores information on features 222, 224, 226, and 228.

Upgrade center layer 130 also includes feature service 230 and global schema 240. Global schema 240 stores configuration data for each customer instance. The configuration data can include modules, software licenses, or other configuration information that is associated with the customer instance for the purpose of configuring the software service. In some examples, the configuration information can include a list of provisioned features and/or available features. Feature service 230 retrieves the configuration data for a customer instance from global schema 240 and processes the configuration data to generate a feature configuration that correspond to the customer instance. The feature configuration can be a list of features that are available to the customer instance and a list of features that have been provisioned by the customer instance. In one example, feature configuration can store features that are available to the customer instance along with their version numbers and a flag for each feature to identify the features that have been provisioned.

Upgrade center layer 140 also includes upgrade center engine 210. Upgrade center 210 includes logic to evaluate the features from upgrade library 220 and the feature configuration of the customer instance from feature service 230 to identify one or more features from upgrade library 220 that are can be enabled by the customer instance. In some examples, this can include performing prerequisite and dependency checks for the features from upgrade library 220. Here, upgrade center engine 210 determines that features 222 and 224 can be enabled by the customer instance when a request is received to upgrade the software service of the customer instance. Upgrade center engine 210 can present features 222 and 224 to the customer instance as feature upgrades that can be enabled by the requester. In some examples, the relevant features can be presented in groups based the importance of the upgrade. For instance, low priority upgrades may be grouped together while important upgrades are grouped together. In one example, the upgrades are provisioned one at a time. In another example, groups of upgrades can be provisioned at one time.

Figure 3:
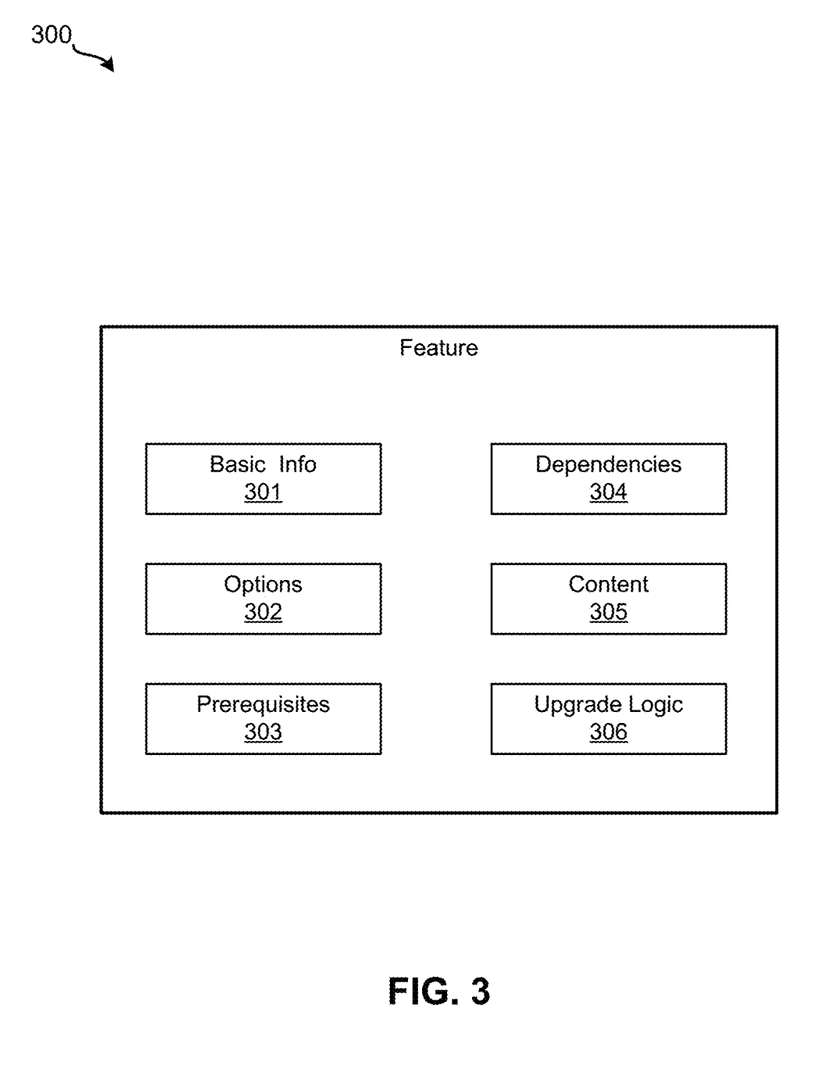
FIG. 3 illustrates a template for storing information about a feature according to one embodiment.

FIG. 3 illustrates a template for storing information about a feature according to one embodiment. Information about a feature upgrade can be stored in upgrade library 220 according to template 300. Template 300 includes a plurality of blocks that each contain one or more fields. The feature information can be stored in the fields which are used by upgrade center engine 210 to present the feature to the customer instance and to determine whether the feature can be enabled by the customer instance. In some examples, the blocks of feature information can be rearranged into a different configuration. In other examples, more or fewer fields can be included or required.

Template 300 includes basic information block 301. Basic information block 301 can store the basic information for the feature. Below is a table of exemplary fields which can be present in basic information block 301 along with a description of each field. In some examples, one or more of these fields can be mandatory or optional.

| FIELD | DESCRIPTION |
|---|---|
| Module | Enter the name of the module you are building the upgrade for. I.e. Platform, PM, GM, Recruiting |
| Category | Choose whether the upgrade is "Important": Upgrades that are considered fundamental to how the application works and looks. I.e. OneAdmin, v12 UI "Recommended": Upgrades that are really great to have for efficiency or upgraded look/feel. "Optional": Most frequently advertisement only upgrades |
| Name | Enter the name of the feature that you want to show up on the advertisement and summary pages. Any text you use that is included in the Text Replacement tool will be replaced with whatever the customer has defined in their text replacement. For example if you use "Goal Management v12" and the customer has defined "Objective" for "goal" in text replacement, it will display as "Objective Management v12" in the Upgrade Center. |
| Description (Rich | Describe the feature. It's best to write the description in $3^{rd}$ person, keeping the description to about 150-250 words. This is the text that both explains and convinces the customer |

-continued

| FIELD | DESCRIPTION |
|---|---|
| Text on Main Page) | to perform the upgrade. Keep the tone upbeat, but realistic (not to sales-y). Be clear and up front about the impact of the upgrade to their system. |

In one embodiment, the fields within basic information block 301 can be utilized to present the feature to the customer instance. For example, upgrade center engine 210 can group features that belong to the same module together when presenting features to the customer instance. As another example, upgrade center 210 can group features that belong to the same category together when presenting features to the customer instance. In another embodiment, upgrade center engine 210 can present features in a sorted list that is sorted by using the fields within basic information block 301. For instance, a customer can select to sort the features that can be enabled by module, by category, alphabetically by name, etc. In yet another embodiment, a text replacement tool can be utilized to edit the name of the feature so that the name is in line with the naming conventions of the customer instance.

Template 300 further includes options block 302. Options block 302 can store options that can be set on the feature. These options can affect the presentation or the availability of the feature to the customer instance. Below is a table of exemplary fields which can be present in options block 302 along with a description of each field. In some examples, one or more of these fields can be mandatory or optional.

| FIELD | DESCRIPTION |
|---|---|
| Advertisement Only | If this upgrade is being added for informational purposes only and you do not want customers to actually be able to perform an upgrade on their own, enter "Yes". By saying "Yes" the upgrade button will be hidden, but customers will still be able to access the information about the upgrade later even when customer service performs the upgrade for them. |
| Admin Privileges necessary to perform upgrade | List any admin privileges that must be already granted/setup to the individual for them to be allowed to perform this upgrade. For example, only the admin with Comp privileges can perform the comp feature upgrades. Typically you will at least need PE.HRadmin, or "Company System and Logo settings" privileges |
| Free (paid upgrades not yet supported, but can be tagged) | Define "Yes" if the upgrade is free "No" if the upgrade requires purchase or license fees. If you answer no, at this time the upgrade should be an advertisement only feature. This auto populates the lower left hand box of the Upgrade Details page to inform the user of key details about the upgrade. |
| Trial Available (not yet available) | Define "Yes" if there is a free trial instance configured and available for testing this upgrade with. "No" if there is no free trial available for the upgrade. |
| Trial Master Instance (Provisioning ID) | Provisioning ID of individual responsible for trial master instance. |
| Track "Loves" | Yes/No. Whether the update feature is popular |

The advertisement only field can be set to define whether the feature upgrade is for advertisement purposes. A feature upgrade that is marked as advertisement only is being stored in upgrade library 220 to provide the customer instance information about the feature upgrade. A customer instance wishing to enable the feature upgrade will still need to contact customer service of the ASP. In one embodiment, upgrade center engine 210 may present information about the feature upgrade but not provide a button to enable the upgrade. A note may be presented along with the information to clarify that the customer instance will need to contact the ASP to enable the feature upgrade.

The admin privileges field can be set to define whether admin privileges are needed by an individual in order to perform the upgrade. For example, upgrade center engine 210 can prevent a user from enabling a feature upgrade when the user does not have the admin privileges as defined by the feature upgrade.

The free field can be set to define whether the feature upgrade can be provisioned without an associated monetary cost. If the feature upgrade is not free, then the upgrade can require a purchase or licensing fees paid to the ASP.

The trial available field can be set to define whether a free trial is available for the feature upgrade. If a free trial is available for the feature upgrade, then the trial available field can be set to yes or set to the duration of time that is provided for the free trial. In some examples, a trial master instance field can also be set to limit the free trial to specific individuals of the customer instance. For example, the provisioning ID of individuals having access to the free trial can be stored in the trial master instance field.

Track "Loves" field can be set to define the popularity of the feature upgrade. Feature upgrades that are frequently provisioned (either through the upgrade center or communication with customer service) can be tracked and marked accordingly, thus providing a customer instance an indication of feature upgrades that historically have been popular.

Template 300 further includes prerequisites block 303. Prerequisites block 303 can store the identity of the features or modules that are required (e.g., a prerequisite) in order to enable the feature upgrade. The name, ID, version number, or other metadata associated with the prerequisite feature or module can be stored in prerequisites block 303. Upgrade center engine 210 can check the prerequisites of a potential feature upgrade before presenting the potential feature upgrade to the customer instance. As a result, only feature upgrade that can be enabled are presented to the customer instance. For example, a compensation management module can be a prerequisite of the new compensation admin feature upgrade. Thus, the upgrade center can present the new compensation admin feature upgrade only if the compensation management module is available to the customer instance (regardless of whether the compensation management module is enabled). Availability can be through purchase, license, and/or provisioning.

Template 300 further includes dependencies block 304. Dependencies block 304 can store a list of dependent features that that the feature upgrade depends upon. As a result, the list of dependent features need to be provisioned on the customer instance before the feature upgrade can be enabled. The upgrade center engine 210 can check for the provisioning of each dependent feature in the list of dependent features before allowing the feature upgrade to be enabled. In some examples, the upgrade center engine 210 can present the feature upgrade along with a warning message to notify the customer instance that the feature upgrade depends on a dependent feature. This can provide guidance to the customer instance on the order that feature upgrades should be enabled in the software service. In other examples, the upgrade center engine 210 can present the feature upgrade with the warning and without the option to provision the feature upgrade. For instance, the upgrade center engine 210 can present the "upgrade" button as greyed out and un-selectable. In yet other examples, the upgrade center engine 210 can present the feature upgrade with a warning that enabling the feature upgrade will also enable all dependent features. The list of dependent features that need to be enabled before enabling the feature upgrade can be presented to the customer instance. If the customer instance chooses to perform the feature upgrade, upgrade center engine 210 can place the feature upgrade and the dependent features in a queue to be sequentially enabled.

Template 300 further includes content block 305. Content block 305 can store content that is to be provided to the customer instance to educate the customer instance about the feature upgrade. Upgrade center engine 210 can process content block 305 and present the information to the customer instance. Below is a table of exemplary fields which can be present in content block 305 along with a description of each field. In some examples, one or more of these fields can be mandatory or optional.

| FIELD | DESCRIPTION |
| --- | --- |
| Video/Images linked from the about page | Provide images and/or videos (at least two images should be provided) to your team to have uploaded to the media server. |
| More Info (external URL) | Any how-to user guides for the admin, or end-user materials you have should be provided to upload to the media server to help enable admins make the upgrade successful. |
| FAQ (external URL to doc(s)) | This is a document you may create in addition to the "more info", which has more of a user guide feel, and instead provide key clarifying points that you will want to highlight. These are similar points to what you would typically cover in an OneVoice call. |

In one embodiment, content block 305 can include links to images and/or videos. Upgrade center engine 210 can retrieve the images/videos by using the links and present the images/videos to the customer instance. The images/videos can be snapshots or instructional videos that describe the feature upgrade. In some examples, the images/videos can be stored in a media server accessible by upgrade center engine 210. Besides images and/or videos, content block 305 can also store how-to user guides, end-user materials, or FAQ materials that can help make the upgrade successful.

Template 300 further includes upgrade logic block 306. Upgrade logic block 306 can store the logic for enabling the feature upgrade. Upgrade center engine 210 can enable the feature upgrade according to what is provided in upgrade logic block 306. Below is a table of exemplary fields which can be present in upgrade logic block 306 along with a description of each field. In some examples, one or more of these fields can be mandatory or optional.

| FIELD | DESCRIPTION |
| --- | --- |
| Provisioning Features to be enabled | Describe any provisioning settings that need to be enabled (and/or disabled) when the feature upgrade is complete. |
| XML to be inserted/ updated | Describe any XML code to be updated per the upgrade details. This must be built in the connector that your engineering team would build - optional for you to describe the XML changes here, or in a separate requirements document for your team. |
| Asynchronous Y/N | Does the feature take some time to update behind the scenes? If Y, then the Upgrade Center schedules a job for the upgrade to be completed and an email is sent to the administrator who performed the upgrade. (This is not configurable if you answer yes). If you answer no, no email is sent and the upgrade takes effect immediately. Synchronous updates will not schedule a job nor will they send an email. |
| Amount of time feature would take to take effect | Insert approximate amount of time to update - this will show up for the user in the lower left hand box of the Upgrade Center. Used for both asynchronous and synchronous. |
| Follow up action "Next Steps" and Configurations on the summary page | This is open text for you to describe what the admin user should do next after the upgrade is complete. Usually this list includes items like setting permissions, downloading templates, and/or personalizing content that has been downloaded. Describe any admin permissions you want to be configured when the upgrade is being completed. For example, if you want the admin who performed the upgrade to have permissions to configure the "Next Steps" |
| Undo Allowed | Define: "Yes" if customers should be allowed to perform the Undo action on this feature. "No" if the customer should not be allowed to perform the Undo action on this feature. |
| Upgrade or Undo fail behavior | There is a standard message that displays if the undo failed. The default is to abort the entire upgrade or undo action that has been requested if it failed. You have the option to define what the specific behavior should be if it fails (for example undo the feature but don't undo the content it loaded) through custom programming (outside the framework) |

In one embodiment, the upgrade logic block 306 can describe the provisioning settings that are to be enabled to enable the feature upgrade. In another embodiment, an "Asynchronous" field within upgrade logic block 306 can specify whether a job is to be scheduled to perform the feature upgrade. A job may need to be scheduled to perform the upgrade when the software service needs to be temporarily unavailable to perform the upgrade. To prevent downtime for users of the customer instance, the feature upgrade can be scheduled for a predefined point in time. The approximate length of time that is required to perform the upgrade can also be stored within upgrade logic block 306. In yet another embodiment, upgrade logic block 306 can include a description of the undo behavior. For example, upgrade logic block 306 can specify that the feature upgrade can be undone within a predefined period of time and/or the steps to undo the feature upgrade. Upgrade logic block 306 can further specify the behavior when the upgrade or the undo fails. For example, upgrade logic block 306 can specify that undoing the feature upgrade will undo the feature but will leave the content.

In one embodiment, a new feature upgrade can be submitted to the upgrade center by filling out the feature upgrade template as described in FIG. 3. In other embodiments, update center layer 140 can include a feature analyzer that is configured to automate the process of importing features to upgrade library 220. In one embodiment, the feature analyzer can analyze new features as they are added to the software service to create an instance of a feature upgrade that is to be stored in upgrade library 220. In another embodiment, the feature analyzer can compare an older version of the software service against a newer version of the software service to automatically update existing feature upgrades in upgrade library 220 or to automatically generate new feature upgrades for upgrade library 220. For example, an existing feature upgrade that originally depended on feature A, version 12 may not depend on feature B, version 11 due to changes in the software service. The feature analyzer can detect these changes and modify dependencies block 304 of the existing feature upgrade to update the dependencies. The feature analyzer can periodically verify that each feature upgrade in the upgrade library is accurate according to the current version of the software service. In some examples, the feature analyzer can perform the verification process after a predefined number of changes to the software service, after a predefined period of time, or after every change to the software service.

Figure 4:
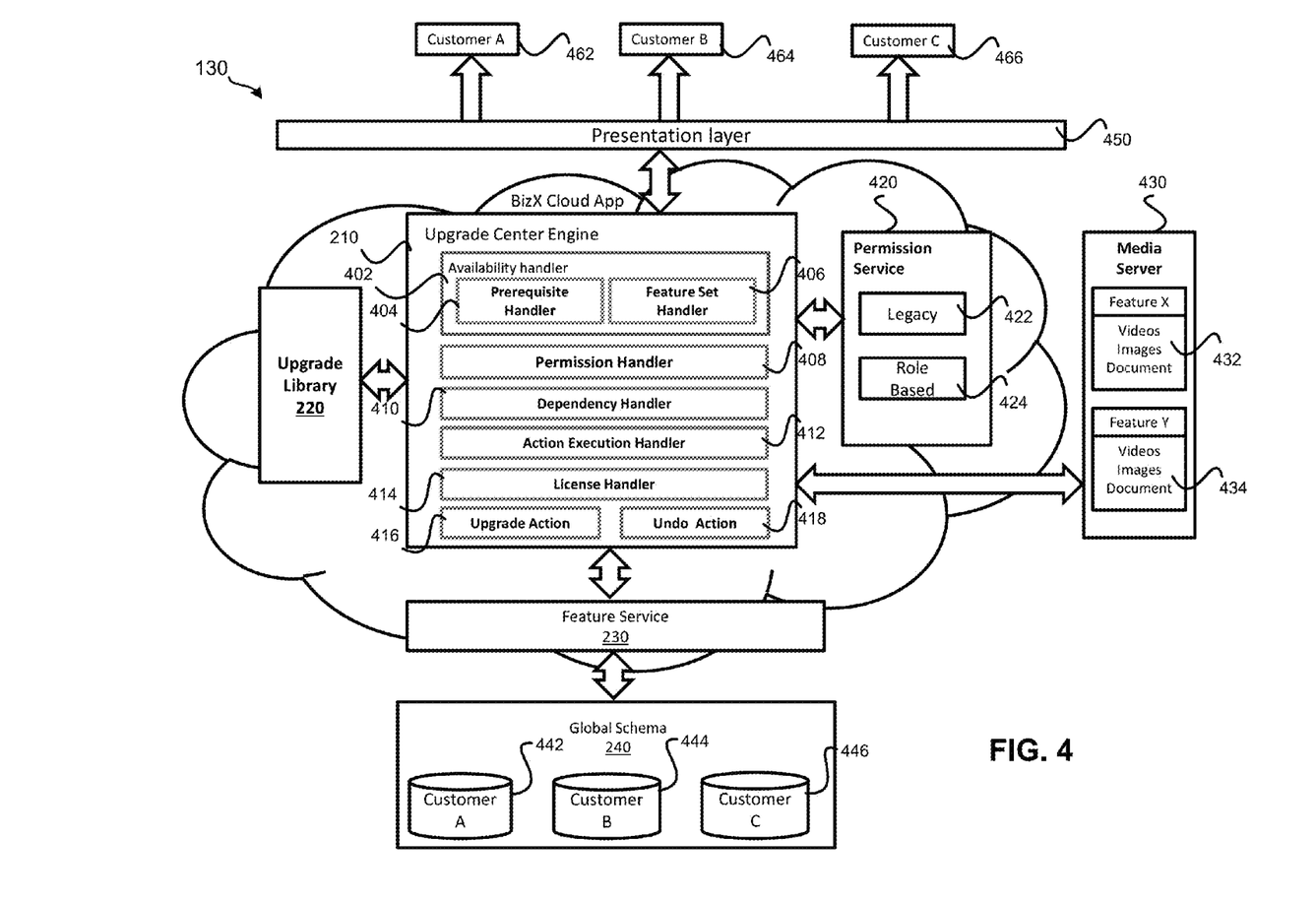
FIG. 4 illustrates an upgrade center layer according to another embodiment.

FIG. 4 illustrates upgrade center layer 140 according to another embodiment. Upgrade center layer 140 can include upgrade center engine 210 that is hosted in the cloud. Upgrade center engine 210 can include a plurality of handlers configured to process information received from upgrade library 220 and feature service 230 to identify one or more feature upgrades from upgrade library 220 that can be enabled by a particular customer instance.

Global schema 240 stores configuration information describing the features that are enabled or available for each customer. For example, global schema 240 can store one or more of the license purchased by each customer, the features that have been provisioned for each customer, or the features available for each customer. Here, the customers are customer A 442, customer B, 444, and customer C 446. Feature service 230 can generate a feature configuration for each customer from the information from global schema 230. The feature configuration can provide useful information such as the features that are provisioned on the customer instance along with the features that are available for the customer instance. Upgrade center engine 210 can analyze the feature configuration and the feature upgrades in upgrade library 220 to identify feature upgrades that can be enabled. In some examples, feature service 230 can process multiple customers in parallel. Similarly, upgrade center engine 210 can process multiple feature configurations in parallel.

Upgrade center engine 210 includes availability handler 402. Availability handler 402 is configured to determine whether a feature upgrade from upgrade library 220 is available for a given customer. An available feature upgrade is a feature upgrade which the customer instance has the right to provision, regardless of whether other limitations exist that may prevent the feature upgrade from being enabled.

Availability handler 402 includes prerequisite handler 404 and feature set handler 406. Prerequisite handler 404 is configured to verify that the prerequisites within prerequisites block 303 of a feature upgrade are met. If prerequisites block 303 stores a module that is a prerequisite for the feature upgrade, feature set handler 406 can determine the features that correspond to the module and pass those features to prerequisite handler 404 to ensure that the prerequisites of the feature upgrade are met. Feature upgrades that pass availability handler 402 are considered feature upgrades that are available to the customer instance.

Upgrade center engine 210 further includes permission handler 408. Permission handler 408 can be configured to process the permission restrictions of the feature upgrade. For example, administration privileges stored in options 303 can be performed to verify whether the user has the proper permissions to enable the feature upgrade. Permissions for users of a customer instance are stored in permission service 420. When requested, permission service 420 can return the permissions for a user of a customer instance. In one embodiment, permissions for users can be stored in legacy format 422 where each user of the customer instance is assigned permissions. In another embodiment, permission for users can be stored in role based format 424 where permission are assigned to different roles in the customer instance. For example, a first user can be assigned a role of an engineer while a second user can be assigned a rule of an administrator. If the feature upgrade requires administrator permissions, permission handler 408 can allow the second user to enable the feature upgrade but prevent the first user from enabling the feature upgrade. In some examples, the feature upgrade may be hidden from the first user. In other examples, the feature upgrade may be presented to the first user with a disclaimer that the feature upgrade can only be performed by a user with administrator permissions.

Upgrade center engine 210 further includes dependency handler 410. Dependency handler 410 can be configured to process dependency restrictions in dependencies block 304 of the feature upgrade. In one embodiment, dependency handler 410 can determine whether a dependent feature found in dependencies block 304 of a feature upgrade is provisioned on the customer instance. If the dependent feature has not been provisioned, dependency handler 410 can generate a warning to be presented along with content describing the feature upgrade. The warning can notify the customer instance that the dependent feature will need to be enabled before the feature upgrade can be enabled. For example, a warning may be presented notifying the customer instance that version 11 of the feature upgrade needs to be enabled before version 12 of the feature upgrade can be enabled.

Upgrade center engine 210 further includes action execution handler 412. Action execution handler 412 is configured to perform either upgrade action 416 (which contains instructions to enable a feature upgrade) or undo action 418 (which contains instructions to undo a feature upgrade). Action execution handler 412 can perform one of these actions on a feature upgrade from upgrade library 220. Action execution handler 412 can retrieve feature content from media server 430 that is to be provided to the customer instance when presenting the feature upgrade. The action execution handler also downloads the relevant content from the content server relevant for the upgrade. These can be content for competency library, templates, XML files, etc. The action execution handler can also determine the latest version of the content, identify whether the customer instance is up-to-date, and download to the customer instance accordingly. Here, media server 430 is storing video, images, and documents for feature X 432 and feature Y 434.

Upgrade center engine 210 further includes license handler 414. License handler 414 is configured to process any licensing agreement requests that are part of enabling a feature upgrade. For example, an end user licensing agreement may be presented to the customer instance. The customer instance may need to accept the end use licensing agreement before the feature upgrade can be enabled. License handler 414 can handle the presentation and acceptance of the license.

Upgrade center engine 210 can process the feature upgrades in upgrade library 220 to identify one or more feature upgrades that can be enabled for each of customer A 442, customer B 444, and customer C 446. The identified feature upgrades can be passed to presentation layer 450 along with their corresponding feature content to be presented to each of customer A 462, customer B 464, and customer C 466. In some examples, the feature upgrades that can be enabled for each customer and the presentation of the feature upgrades to the customers via presentation layer 450 can happen in parallel.

Figure 5:
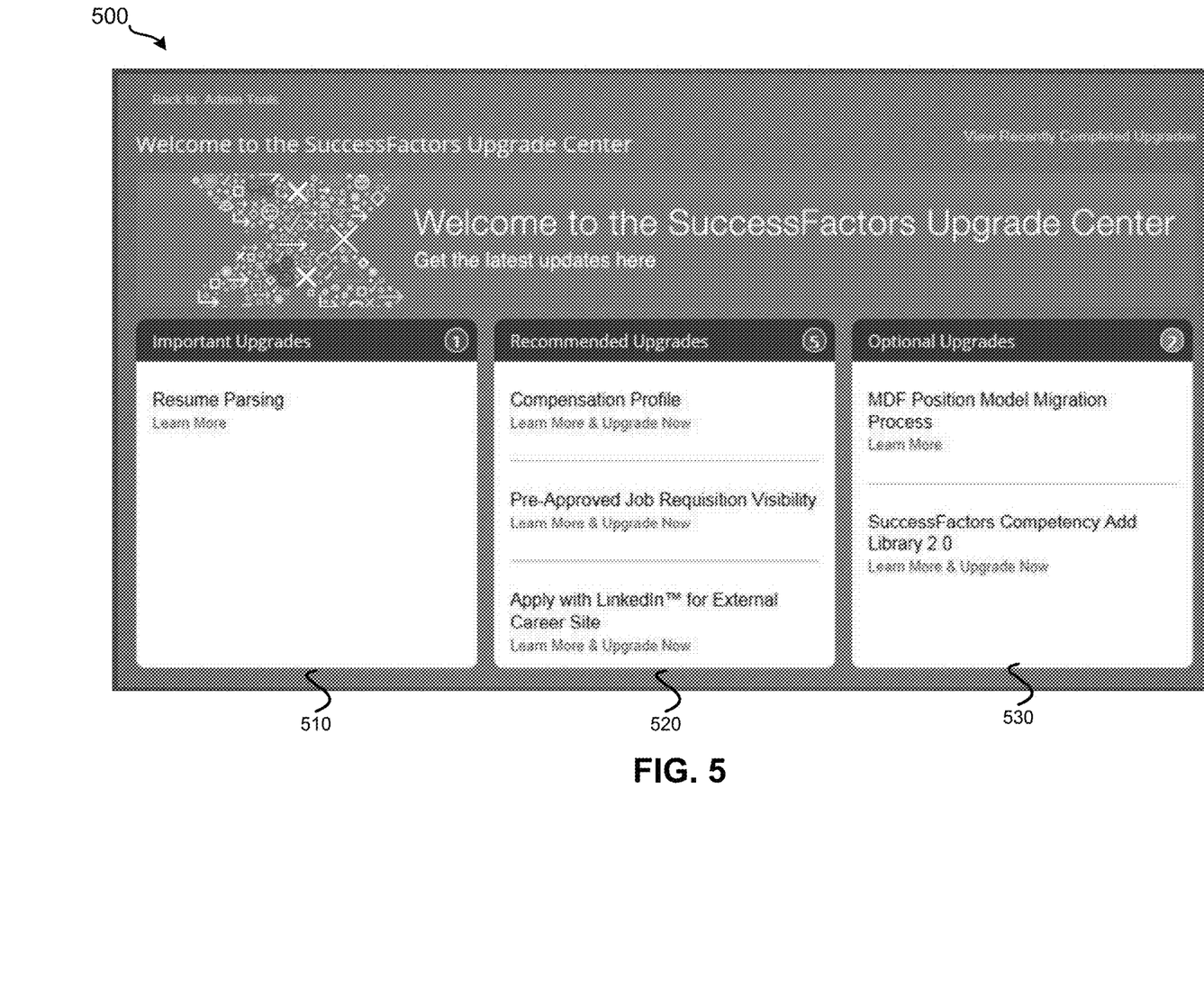
FIG. 5 illustrates a user interface to present feature upgrades that can be enabled by a customer instance according to one embodiment.

FIG. 5 illustrates a user interface to present feature upgrades that can be enabled by a customer instance according to one embodiment. User interface 500 presents the feature upgrades sorted by category. Important upgrades are presented in window 510, recommended upgrades are presented in window 520, and optional upgrades are presented in window 530. As shown, all feature upgrades that can be enabled are presented to the user simultaneously. Above each window is a number indicating the number of feature upgrades that can be enabled for each category. In some examples, the upgrade center can schedule all feature upgrades within the category to be enabled when the number is selected. In other examples, a user can scroll through the window to peruse the feature upgrades when the feature upgrades available do not fit within the window (for example, window 520).

Figure 6:
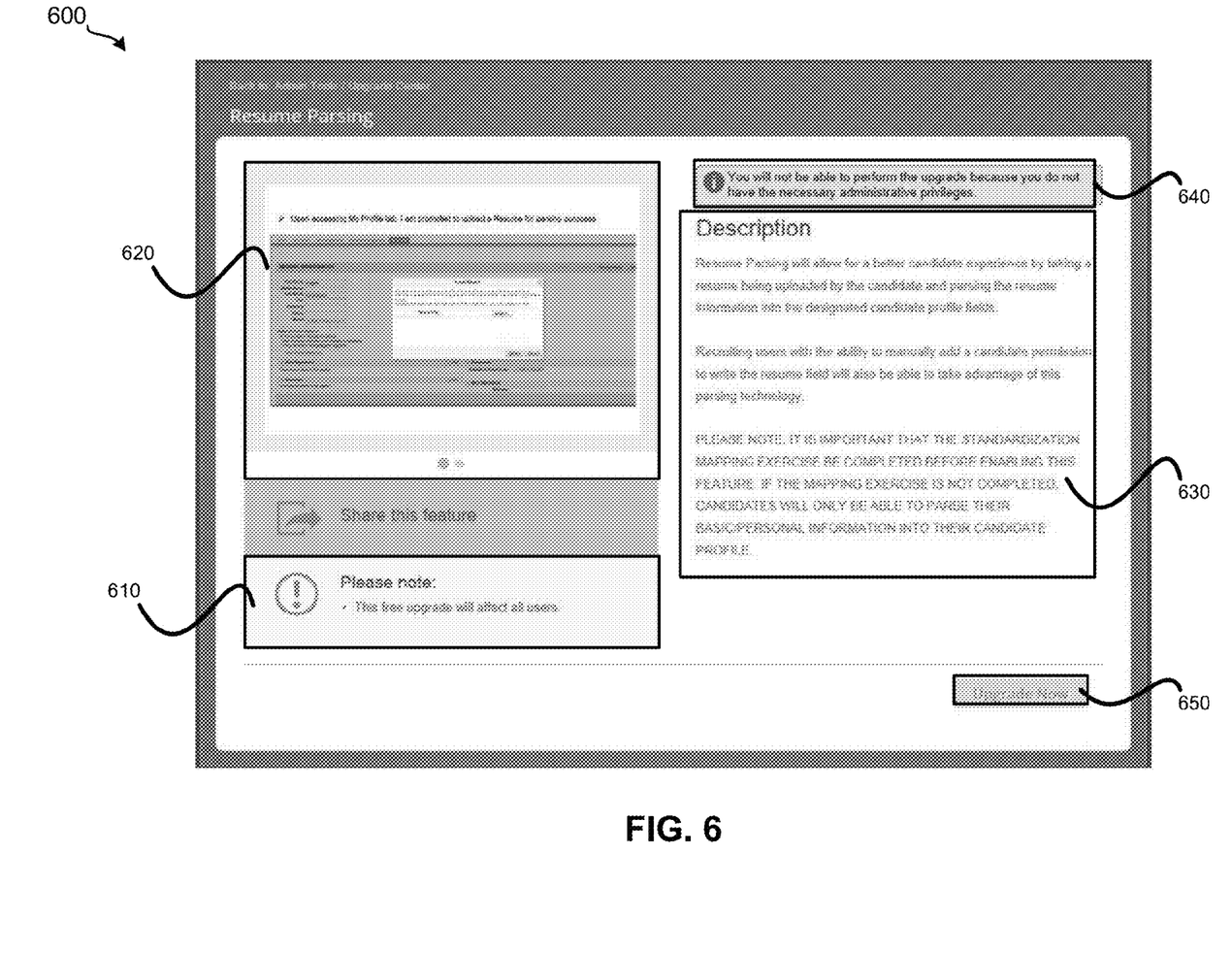
FIG. 6 illustrates a user interface to present details on a feature upgrade that can be enabled by a customer instance according to one embodiment.

FIG. 6 illustrates a user interface to present details on a feature upgrade that can be enabled by a customer instance according to one embodiment. User interface 600 is configured to provide information about the feature upgrade to the customer instance for review. Upon reviewing the information, the customer instance can decide whether to enable the feature upgrade. User interface 600 includes window 610 to display a note on whether this is a free upgrade. User interface 600 further includes window 620 for presenting screenshots of the feature upgrade. User interface 600 further includes window 630 to provide a description about the feature upgrade. The screenshots and the description can be retrieved from media server 430. User interface 600 further includes window 640 for presenting warnings. The warnings can inform the customer instance why although the upgrade is available however cannot be enabled by the customer instance. The customer instance is invited to correct the warnings before attempting to enable the feature upgrade again. Here, a warning is provided in window 640 to inform the customer instance that the feature upgrade depends upon another feature currently not enabled on the customer instance. User interface 600 further includes window 650 to allow the customer instance to enable the feature upgrade. If the feature upgrade cannot be enabled due to warnings or other issues with the feature upgrade, window 650 can be removed or greyed out.

Figure 7:
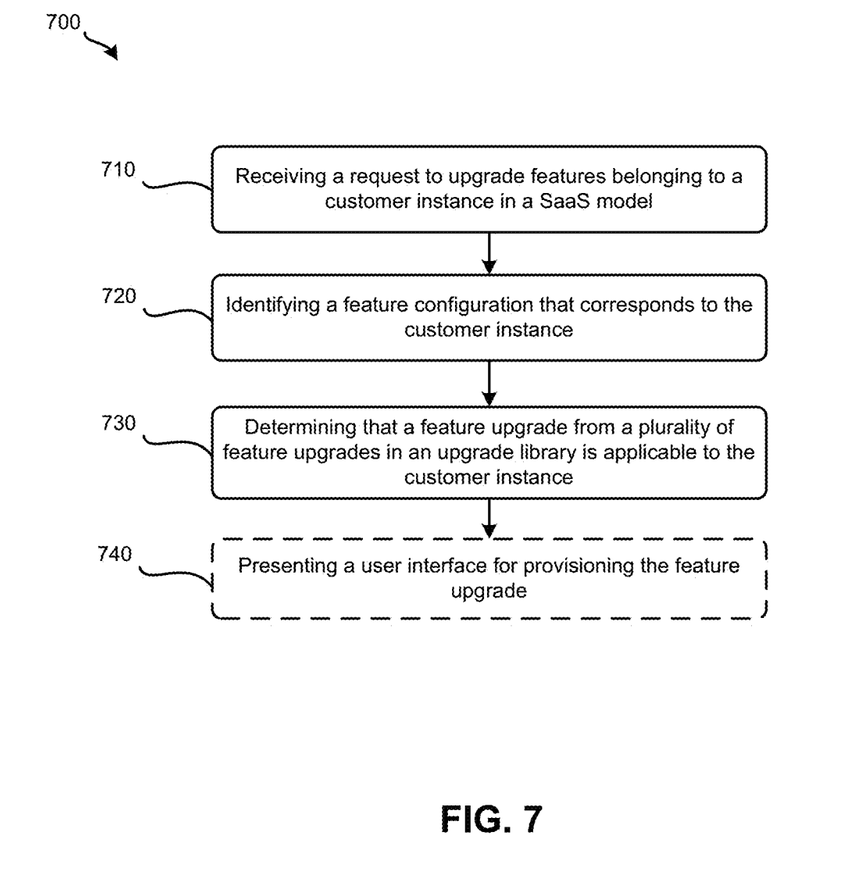
FIG. 7 illustrates a process for accessing an application instance hosted by a data center.

FIG. 7 illustrates process 700 for accessing an application instance hosted by a data center. Process 700 can be stored in computer readable code and executed by a processor. For example, process 700 can be a part of the computer readable code belonging to the handlers of the upgrade center engine 210. Process 700 begins by receiving a request to upgrade features belonging to a customer instance in a SaaS model at 710. The request can be received from a user of the customer instance. In one example, the request is received from a user with administrator permissions. In another example, the request is received from a user with sales permissions. Process 700 continues by identifying a feature configuration that corresponds to the customer instance at 720. The feature configuration can include a plurality of features from the SaaS model that are available to the customer instance. In one example, identifying the feature configuration can include identifying a software license issued to the customer instance and identifying the plurality of features according to the software license. For instance, feature set handler 406 can identify the plurality of features from the software license.

Process 700 then continues by determining that a feature upgrade from a plurality of feature upgrades in an upgrade library is applicable to the customer instance at 730. In one embodiment, this can include performing a prerequisite check on the feature upgrade to determine that the feature upgrade is an updated version of a feature from the feature configuration. In one example, the feature from the feature configuration can be a feature that is provisioned on the customer instance. In another embodiment, this can include performing a prerequisite check to determine whether the user of the customer instance has the proper permissions to enable the feature upgrade. In yet another embodiment, this can include performing a dependency check of the feature upgrade to determine whether one or more dependent features of the feature upgrade have been provisioned on the customer instance.

Process 700 can then optionally continue by presenting a user interface for provisioning the feature upgrade at 740. The user interface can include a warning when a dependent feature of the feature upgrade is un-provisioned on the user interface. In some examples, the user interface can present images, videos, and documents related to the feature upgrade to educate the user of the customer instance on the feature upgrade. After provisioning the feature, the user can also potentially undo the feature upgrade. Undoing the feature upgrade can include verifying that features which depend on the feature upgrade have been un-provisioned before un-provisioning the feature upgrade. The feature upgrade stored in the upgrade library can identify the features which depend on the feature upgrade.

Figure 8:
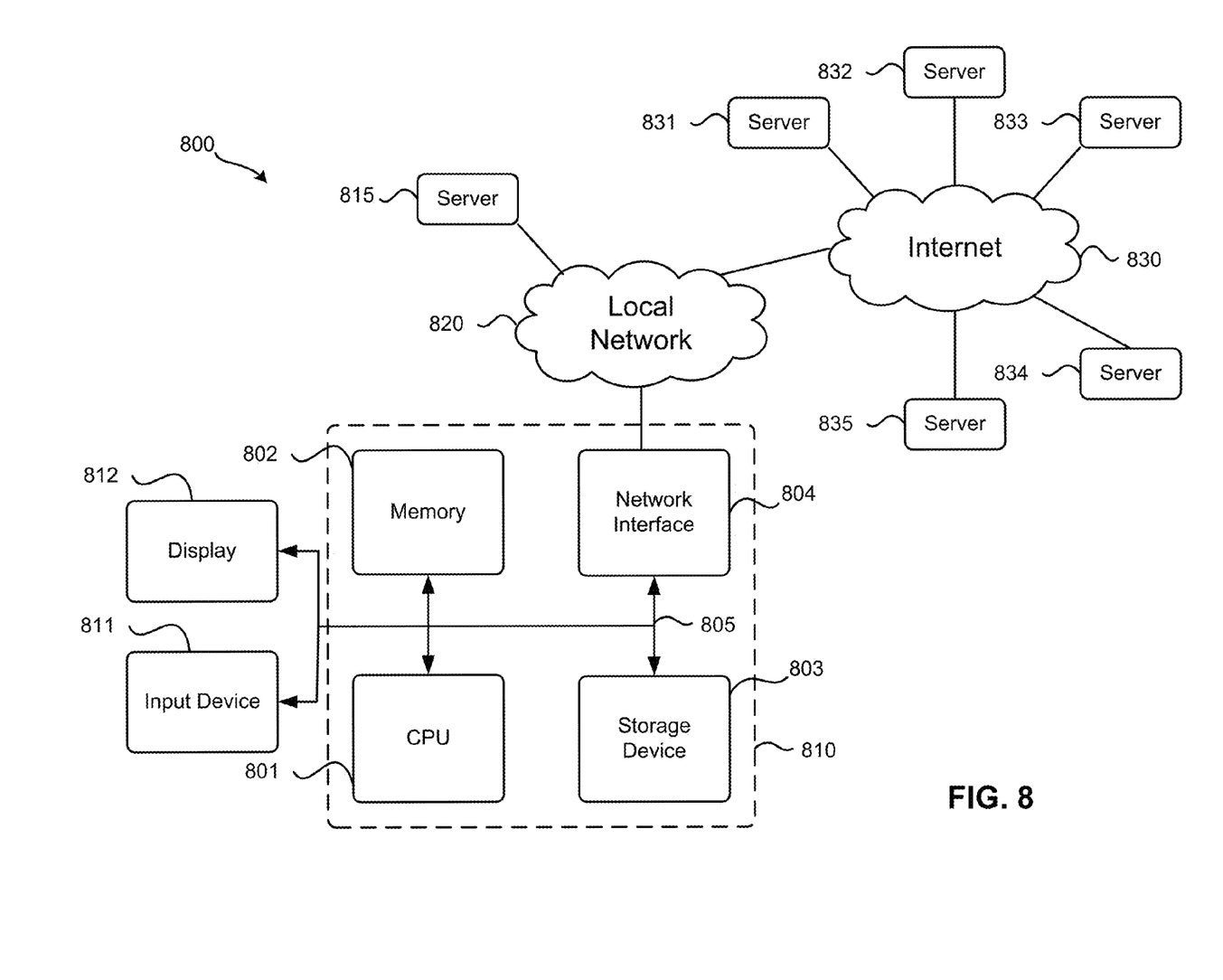
FIG. 8 illustrates an exemplary computer system according to one embodiment.

An exemplary computer system 800 is illustrated in FIG. 8. Computer system 810 includes a bus 805 or other communication mechanism for communicating information, and a processor 801 coupled with bus 805 for processing information. Computer system 810 also includes memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
    identifying, by a processor of a first computing device in a set of computing devices, a plurality of configuration data associated with a plurality of different customers for a plurality of instances of a plurality of applications hosted on a subset of the set of computing devices;
    generating, by the processor of the first computing device, a plurality of feature configurations associated with the plurality of instances of the plurality of applications based on the plurality of configuration data associated with the plurality of different customers, wherein each feature configuration in the plurality of feature configurations specifies a set of features that are provisioned on a particular instance in the plurality of instances of a particular application in the plurality of applications with which the feature configuration is associated and a set of features that are available to and not provisioned on the particular instance of the particular application;
    receiving, by the processor of the first computing device, a first request from a client device to upgrade features belonging to an instance in the plurality of instances of an application in the plurality of applications associated with a customer in the plurality of different customers, wherein the instance of the application is accessible by the client device through a network connecting the client device to the set of computing devices;
    identifying, by the processor of the first computing device, a feature configuration in the plurality of feature configurations that corresponds to the instance of the application, the feature configuration specifying a set of features that are provisioned on the instance of the application and a set of features that are available to and not provisioned on the instance of the application;
    storing a plurality of feature upgrades in an upgrade library hosted on a second computing device in the set of computing devices;
    determining, by the processor of the first computing device, that a feature upgrade from the plurality of feature upgrades stored in the upgrade library is applicable to the instance of the application based on the feature configuration and the plurality of feature upgrades;
    provisioning, by the processor of the first computing device, the feature upgrade for the instance of the application based on the determination;
    detecting, by the processor of the first computing device, a second request received from the client device to un-provision the feature upgrade of the instance of the application;
    verifying, by the processor of the first computing device, that a feature of the instance of the application that depends on the feature upgrade has been un-provisioned; and
    un-provisioning, by the processor of the first computing device, the feature upgrade of the instance of the application in response to the verification.

2. The computer-implemented method of claim 1, wherein identifying the feature configuration comprises:
    first identifying, by the processor of the first computing device, a software license issued to the instance of the application; and
    second identifying, by the processor of the first computing device, the first plurality of features according to the software license.

3. The computer-implemented method of claim 1, wherein determining that the feature upgrade is applicable to the instance of the application comprises:
    performing, by the processor of the first computing device, a prerequisite check of the feature upgrade to determine that the feature upgrade is an updated version of a feature from the feature configuration.

4. The computer-implemented method of claim 3, wherein the feature is provisioned on the instance of the application.

5. The computer-implemented method of claim 1, wherein determining that the feature upgrade is relevant to the instance of the application comprises:
    performing, by the processor of the first computing device, a dependency check of the feature upgrade to determine whether one or more dependent features of the feature upgrade have been provisioned on the instance of the application.

6. The computer-implemented method of claim 5 further comprising:
    presenting, by the processor of the first computing device, a graphical user interface (GUI) for provisioning the feature upgrade, wherein the GUI displays a warning when a dependent feature of the feature upgrade is un-provisioned on the instance of the application.

7. The computer-implemented method of claim 1, wherein determining that the feature upgrade is applicable to the instance of the application comprises:
    determining that the feature upgrade is included in the plurality of feature upgrades stored in the upgrade library; and performing a prerequisite check of the feature upgrade to determine that the feature upgrade is an updated version of a feature specified in the feature configuration; and performing a dependency check of the feature upgrade to determine that a set of dependent features of the feature upgrade are included in the set of features specified in the feature configuration that are provisioned on the instance of the application.

8. The computer-implemented method of claim 1, wherein the first request is received through a selection of user interface (UI) element included in graphical user interface (GUI) presented on a display of the client device.

9. The computer-implemented method of claim 1, wherein the feature upgrade is a first feature upgrade, the computer-implemented method further comprising:

determining, by the processor of the first computing device, that a second feature upgrade from a plurality of feature upgrades stored in an upgrade library hosted on the set of computing devices is applicable to the instance of the application based on the feature configuration and the plurality of feature upgrades; and presenting, by the processor of the first computing device, a graphical user interface (GUI) comprising a first user interface (UI) element associated with the first feature upgrade and a second UI element associated with the second feature upgrade.

10. A non-transitory computer readable storage medium storing one or more programs executable by a processor of a first computing system in a set of computing systems, the one or more programs comprising instructions for:

identifying a plurality of configuration data associated with a plurality of different customers for a plurality of instances of a plurality of applications hosted on a subset of the set of computing devices;

generating a plurality of feature configurations associated with the plurality of instances of the plurality of applications based on the plurality of configuration data associated with the plurality of different customers, wherein each feature configuration in the plurality of feature configurations specifies a set of features that are provisioned on a particular instance in the plurality of instances of a particular application in the plurality of applications with which the feature configuration is associated and a set of features that are available to and not provisioned on the particular instance of the particular application;

receiving a first request from a client device to upgrade features belonging to an instance in the plurality of instances of an application in the plurality of applications associated with a customer in the plurality of different customers, wherein the instance of the application is accessible by the client device through a network connecting the client device to the set of computing devices;

identifying a feature configuration in the plurality of feature configurations that corresponds to the instance of the application, the feature configuration specifying a set of features that are provisioned on the instance of the application and a set of features that are available to and not provisioned on the instance of the application;

storing a plurality of feature upgrades in an upgrade library hosted on a second computing device in the set of computing devices;

determining that a feature upgrade from the plurality of feature upgrades stored in the upgrade library is applicable to the instance of the application based on the feature configuration and the plurality of feature upgrades;

provisioning the feature upgrade for the instance of the application based on the determination;

detecting a second request received from the client device to un-provision the feature upgrade of the instance of the application;

verifying that a feature of the instance of the application that depends on the feature upgrade has been un-provisioned; and un-provisioning the feature upgrade of the instance of the application in response to the verification.

11. The non-transitory computer readable storage medium of claim 10, wherein identifying the feature configuration comprises:

first identifying a software license issued to the instance of the application; and second identifying the first plurality of features according to the software license.

12. The non-transitory computer readable storage medium of claim 10, wherein determining that the feature upgrade is applicable to the instance of the application comprises:

performing a prerequisite check of the feature upgrade to determine that the feature upgrade is an updated version of a feature from the feature configuration.

13. The non-transitory computer readable storage medium of claim 12, wherein the feature is provisioned on the instance of the application.

14. The non-transitory computer readable storage medium of claim 10, wherein determining that the feature upgrade is relevant to the instance of the application comprises:

performing a dependency check of the feature upgrade to determine whether one or more dependent features of the feature upgrade have been provisioned on the instance of the application.

15. The non-transitory computer readable storage medium of claim 14, wherein the one or more programs further comprises instructions for:

presenting a graphical user interface (GUI) for provisioning the feature upgrade, wherein the GUI displays a warning when a dependent feature of the feature upgrade is un-provisioned on the instance of the application.

16. A set of computing devices comprising a computer implemented system, the computer implemented system comprising:

one or more computer processors; and a non-transitory computer-readable storage medium comprising instructions, that when executed, control the one or more computer processors to be configured for:

identifying a plurality of configuration data associated with a plurality of different customers for a plurality of instances of a plurality of applications hosted on a subset of the set of computing devices;

generating a plurality of feature configurations associated with the plurality of instances of the plurality of applications based on the plurality of configuration data associated with the plurality of different customers, wherein each feature configuration in the plurality of feature configurations specifies a set of features that are provisioned on a particular instance in the plurality of instances of a particular application in the plurality of applications with which the feature configuration is associated and a set of features that are available to and not provisioned on the particular instance of the particular application;

receiving a first request from a client device to upgrade features belonging to an instance in the plurality of instances of an application in the plurality of applications associated with a customer in the plurality of different customers, wherein the instance of the application is accessible by the client device through a network connecting the client device to the set of computing devices;

identifying a feature configuration in the plurality of feature configurations that corresponds to the instance of the application, the feature configuration specifying a set of features that are provisioned on the instance of the application and a set of features that are available to and not provisioned on the instance of the application;

storing a plurality of feature upgrades in an upgrade library hosted on a computing device in the set of computing devices;

determining that a feature upgrade from the plurality of feature upgrades stored in the upgrade library is applicable to the instance of the application based on the feature configuration and the plurality of feature upgrades;

provisioning the feature upgrade for the instance of the application based on the determination;

detecting a second request received from the client device to un-provision the feature upgrade of the instance of the application;

verifying that a feature of the instance of the application that depends on the feature upgrade has been un-provisioned; and un-provisioning the feature upgrade of the instance of the application in response to the verification.

17. The computer implemented system of claim 16, wherein determining that the feature upgrade is applicable to the instance of the application comprises:

performing a prerequisite check of the feature upgrade to determine that the feature upgrade is an updated version of a feature from the feature configuration.

18. The computer implemented system of claim 17 wherein the feature is provisioned on the instance of the application.

19. The computer implemented system of claim 16, wherein determining that the feature upgrade is relevant to the instance of the application comprises:

performing a dependency check of the feature upgrade to determine whether one or more dependent features of the feature upgrade have been provisioned on the instance of the application.

20. The computer implemented system of claim 19, wherein the instructions further control the one or more computer processors to be configured for:

presenting a graphical user interface (GUI) for provisioning the feature upgrade, wherein the GUI displays a warning when a dependent feature of the feature upgrade is un-provisioned on the instance of the application.

* * * * *